Patented Feb. 2, 1954

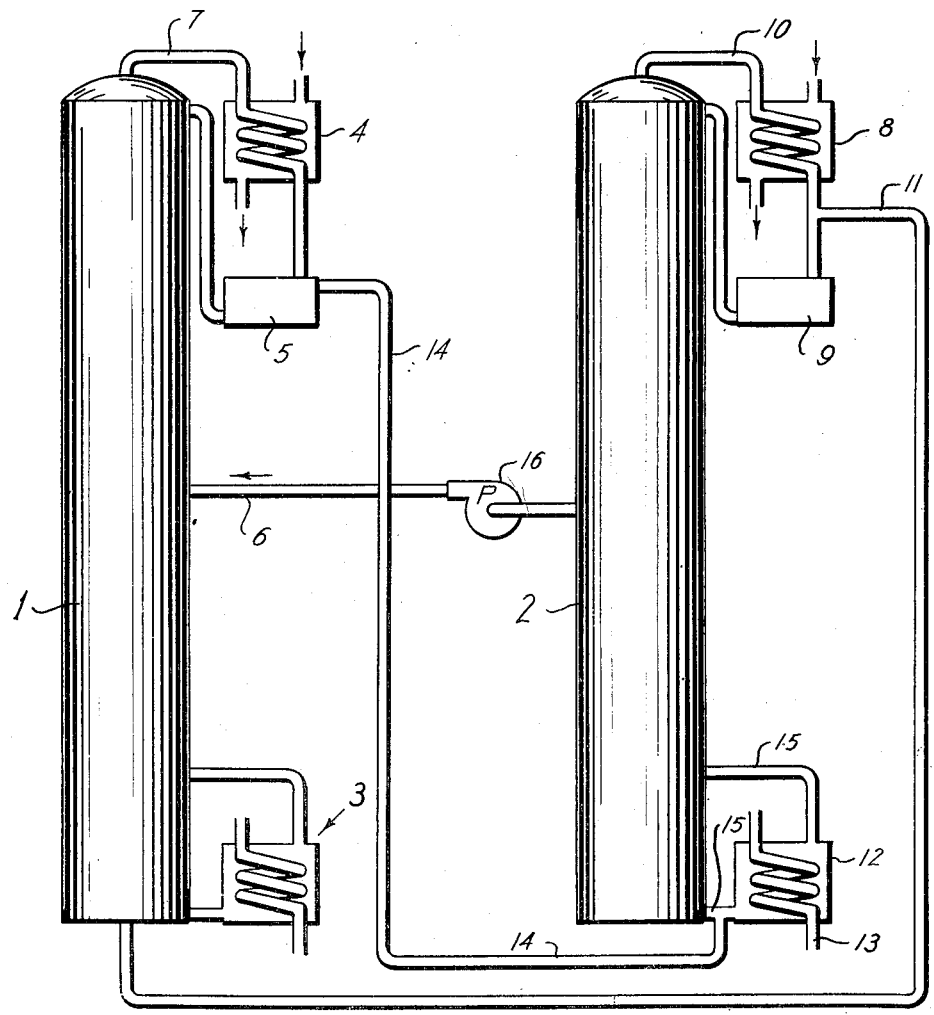

2,667,764

UNITED STATES PATENT OFFICE 2,667,764

REFRIGERATION METHOD, SYSTEM, AND APPARATUS

Nelson C. Turner, Houston, Tex., assignor to Hudson Engineering Corporation, Houston, Tex., a corporation of Texas Application January 18, 1950, Serial No. 139,231

5 Claims. (Cl. 62—119)

This invention relates to a method, system and apparatus for producing refrigeration and refers more particularly to a refrigeration cycle which involves the use of two volatile and completely miscible liquids which may be readily separated and have different boiling points at the pressures existent within the cycle.

One of the primary advantages of the refrigeration cycle of this invention resides in its flexibility which permits the operation of the cycle to meet particular requirements. This flexibility is possible because of the wide variety of liquids from which the two liquids may be selected to obtain near optimum thermodynamic efficiency. In addition, the cycle lends itself to employment of a low level heat source for power, such as for instance, exhaust steam normally present as a waste product in many plant operations or a solar heating system.

By way of example, but not by way of limitation, the method and system of this invention is especially adapted for use in chilling absorption oil used in the extraction of gasoline from natural gas. The refrigeration cycle may employ the light hydrocarbons, available as products of the plant, and may utilize the available low pressure exhaust steam from the plant, which would be otherwise wasted.

An object of this invention is to provide a method and system of refrigeration which is flexible, efficient and economical.

Another object is to provide a method, system and apparatus for producing refrigeration which may employ a low level heat source for power.

A further object is to provide a method and system of refrigeration which is based on the reversibility of the fractionating cycle normally employed in the separation mixture of two volatile liquids having different boiling points.

Other and further objects of the invention will appear from the description.

The invention, in general, comprises the introduction of two substantially pure, volatile, completely miscible liquid components into a column or tower wherein the liquids have different boiling points at the pressures within the tower, the high boiling liquid being introduced into the top of the tower and the low boiling liquid being introduced into an evaporator communicating with the bottom of the tower under conditions which will effect the evaporation of the low boiling liquid and flowing the vapors upwardly through the tower countercurrently with the downcoming liquids. A liquid mixture is continuously withdrawn about the mid-point of the tower to prevent accumulation of substantial quantities of the high boiling liquid in the bottom of the tower. The conditions within the tower are maintained so that the low boiling component is absorbed in the downcoming liquid causing vaporization of the latter component. The vapors at the upper end of the tower are substantially the high boiling component and are cooled and condensed and reintroduced into the upper end of the tower. The liquid in the bottom of the tower is substantially the low boiling component and is circulated through the evaporator where it volatilizes and the gases are reintroduced into the bottom of the tower. The material to be cooled is circulated through the evaporator and supplies the heat of vaporization at a low level, and this is removed in the cooler and condenser at a high level.

The liquid withdrawn from the mid-section of the tower may be separated into its components to provide the liquid components to be introduced into the opposite ends of the tower. This separation is preferably accomplished by fractionation, which may be an actual part of the cycle.

The liquids may be chosen from a wide variety to select the pair that is best suited to a specific refrigeration problem. The choice of liquids is governed by three temperatures: (1) The temperature at which the heat supply is available in the fractionator; (2) the temperature at which the cooling medium in the fractionator and mixing towers is available; and (3) the temperature of the required refrigeration. In selecting the liquids, two factors relating to their boiling points must be considered. At the pressures within the fractionator, the lower boiling liquid must have a boiling point higher than the available cooling temperature and the higher boiling liquid must have a boiling point lower than the available heating temperature. At the pressures within the mixing or refrigeration tower, the higher boiling component must have a boiling point higher than the available cooling temperature and the lower boiling component must boil at lower temperatures than the required refrigeration temperature. The lower boiling paraffins from ethane to decane seem best adapted for the purpose, although any two volatile liquids that are completely miscible within the range of operating temperatures and which may be readily separated may be selected.

From the foregoing, it is believed apparent that the refrigeration method and cycle involves the reversal of a fractionation separation and that it lends itself to combination with a normal fractionation column to separate the withdrawn liquid into its component parts. This reversal even extends to an inverting of the normal fractionating column by introducing the low boiling fraction into the bottom of the tower and the high boiling fraction into the top of the tower and withdrawing the liquid mixture from approximately the normal feed tray of the column. The ratio of the two components in the refrigeration tower is the converse of the reflux ratio for fractionating the liquid mixture of the two components. Instead of cooling the vapors of the light boiling constituents for introduction into the tower as a reflux, the liquid light component is vaporized to provide refrigeration and the heat thus absorbed, at a low level, is dissipated by the high boiling component in the cooler at the top of the tower.

It is believed that an understanding of the invention will be facilitated by referring to the drawings which form a part of the instant specification, are to be read in conjunction therewith and wherein the single figure is a flow diagram representation of a refrigeration system embodying the invention.

In the drawings, the numeral 1 designates the usual fractionator column and the numeral 2 identifies the other or second tower which is sometimes referred to herein as the refrigerating tower. The fractionating tower is equipped with the usual reboiler 3 through which the liquid bottoms of the tower are circulated to strip the light boiling components from the liquid bottoms. At the top of the tower is the usual cooler-condenser system including cooler and condenser 4 and the accumulator 5.

The fractionating tower and its operation may be conventional in all respects, the feed mixture to be separated being introduced at a mid-section into the tower through conduit 6. The gases within the column rise in intimate gas to liquid contact with the downcoming liquids. The higher boiling bottom product is circulated through the reboiler 3, which may be heated with any source of heat and desirably a low level heat such as low pressure exhaust steam, a solar heat system or the like. The low boiling constituents are released as vapors in the reboiler and pass upwardly through the tower. The gases emitted from the top of the tower through conduit 7 are the substantially pure low boiling components and are cooled in cooler 4 which may utilize water or other suitable coolant. The condensed gases are accumulated in vessel 5 and a part are recirculated into the fractionator as a reflux liquid. The remainder of the liquid is introduced into refrigeration tower 2 as will be hereinafter more fully explained. A portion of the high boiling component is withdrawn from the bottom of the tower and is introduced into the refrigeration tower in a manner to be described.

The refrigeration tower may be of the usual bubble tray type but the conduit 6 communicating with the mid-section of the column is adapted to withdraw a liquid mixture from approximately what normally would be the feed tray of the column if it were employed as a fractionator. At the top of the column a cooler-condenser system is provided with a cooler and condenser 8 and accumulator 9 adapted to cool and condense the high boiling gases emitted from the upper end of the tower through conduit 10. Conduit 11, for withdrawing a portion of the fractionator bottom liquid communicates with conduit 10 between the cooler and accumulator for suppling additional liquid to the top of the tower. The bottom of the column is equipped with an evaporator 12 through which the medium to be cooled is passed through coil 13 and in which the lower boiling liquid component is evaporated to provide refrigeration. This low boiling liquid component is supplied in part through conduit 14 communicating with condenser 5 and in part through conduit 15 communicating with the bottom of column 2. The volatilized low boiling component is passed from evaporator 12 into the bottom of the column through line 15.

It is necessary to operate the fractionating column 1 at a higher pressure than the refrigerating column 2 and a pump 16 may be provided for discharging the liquid mixture from the middle of column 2 into the fractionating column 1.

The coolant for cooler 8 may be water or any other suitable coolant and usually the same source of coolant may be provided for both coolers 4 and 8.

It is believed that the operation of the refrigeration cycle and method of this invention is apparent from the foregoing description. The column 1 operates in the conventional manner for a fractionating column and provides substantially pure liquid components for introduction into the refrigerating column 2. The refrigerating column 2 functions as in inverted fractionating column with the pure components being introduced into the ends thereof in a ratio which is the converse of the reflux ratio for fractionating a mixture of such liquid, and mixed by countercurrent flow therein. A portion of the liquid mixture is withdrawn from an intermediate section of the column 2 and is pumped into column 1 for fractionation.

Whereas the usual fractionating system may be regarded as a form of heat engine, a reversal of the process as in column 2 produces a refrigerating system. The combination of the conventional fractionating column 1 with the reversed fractionating column 2 provides the completed refrigeration cycle. For convenience of explanation, but not by way of limitation, the operation of the cycle will be discussed wherein the two-column closed system contains propane as a low boiling component and isobutane as the high boiling component.

The column 1 operates in a strictly conventional manner, taking the propane-isobutane feed mixture through conduit 6 at an intermediate point. The propane discharged from the top of column 1 is cooled and condensed in exchanger 4 and accumulated in vessel 5. A portion of the condensed propane is circulated into the column 1 as a reflux liquid and the balance is circulated through conduit 14 into evaporator 12. The evaporator 12 operates at a reduced pressure and the propane is volatilized therein absorbing heat from the medium circulated through coil 13. The propane vapor from the evaporator passes into column 2 at its lower end and rises in the column in countercurrent contact with liquid isobutane which has been introduced at the top of the column. In this gas liquid contact, the propane vapor is absorbed by the liquid and a portion of the isobutane is evaporated. By the time the liquid has reached the base of the column, it will be composed of substantially pure propane and the vapor at the top of the column will be composed of substantially pure isobutane. The isobutane vapor passes into the cooler-condenser system where it is liquefied and gives up heat to the cooling medium such as water which is circulated through cooler 8. The condensed isobutane, together with the isobutane introduced through conduit 11 is then passed into the upper portion of column 2 to flow downwardly in contact with the upcoming gas.

The liquid propane accumulated in the bottom of column 2 re-enters the reboiler or evaporator 12, through line 15, and is evaporated.

In order to prevent the accumulation of substantial quantities of isobutane in the evaporator and lower portion of column 2, it is necessary to continuously withdraw from a point mid-way of the column a mixture of propane and isobutane. This mixture is pumped by pump 16, through conduit 6 into fractionating column 1 where it is again separated into its constituents for recirculation in the refrigeration column.

This cycle is especially adapted for use in chilling lean absorption oil in connection with the extraction of gasoline and the heavier hydrocarbon constituents from natural gas or the like. The products from the extraction plant may be used as the refrigerant liquids providing a readily available and economical source of liquids. In such extraction plants, there is usually available a source of low level heat such as low pressure exhaust steam which, unless otherwise utilized, must be condensed and wasted. This exhaust steam may be utilized as the power source for the refrigeration cycle and employed in reboiler 3 as the source of heat.

It is contemplated that for other refrigeration uses such as, for example, air conditioning, in certain climatic locations, a solar heat system may be employed as a source of power for energizing the reboiler 3.

From the foregoing, it will be seen that this invention is one well adapted to attain all of the ends and objects hereinabove set forth, together with other advantages which are obvious and which are inherent to the structure and process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. The method of producing refrigeration utilizing two volatile and completely miscible liquids which may be readily separated by fractionation and having materially different boiling points at the pressures existant within the system, comprising the steps of evaporating the lower boiling liquid in an evaporation zone to produce refrigeration, passing the resultant gas in countercurrent contact with the higher boiling liquid in a gas liquid contacting zone under controlled ratios and withdrawing a mixture of said liquids from an intermediate point in said contacting zone such that all the gas released from the contacting zone is substantially the higher boiling component, and all the liquid bottoms product from the contacting zone is substantially the lower boiling component, passing the liquid bottoms product into the evaporation zone and countercurrently contacting the resultant gas with the liquid in said contacting zone, condensing the contacting zone gas product and passing the condensate into the contact zone as a liquid.

2. The method of producing refrigeration utilizing two volatile and completely miscible liquids which may be readily separated by fractionation and having materially different boiling points at the pressures existent within the system, comprising the steps of evaporating the lower boiling liquid in an evaporation zone to produce refrigeration, passing the resultant gas in countercurrent contact with the higher boiling liquid in gas liquid contacting zone under controlled ratios such that all the gas released from the contact contacting zone is substantially the higher boiling component, and all the liquid bottoms from the contacting zone is substantially the lower boiling component, passing the liquid bottoms product into the evaporation zone and countercurrently contacting the resultant gas with the liquid in said contacting zone, condensing the contacting zone gas product and passing the condensate into the contacting zone as said countercurrently flowing liquid and withdrawing a liquid mixture from an intermediate point of the contacting zone, said mixture containing the two components in the same ratio of their introduction into the contacting zone and the evaporator respectively.

3. The method of producing refrigeration utilizing two volatile and completely miscible liquids which may be readily separated by fractionation and having materially different boiling points at the pressures existent within the system, comprising the steps of evaporating the lower boiling liquid in an evaporating zone to produce refrigeration, passing the resultant gas in countercurrent contact with the higher boiling liquid in a gas liquid contact contacting zone under controlled ratios such that all the gas released from the contacting zone is substantially the higher boiling component, and all the liquid bottoms product from the contacting zone is substantially the lower boiling component, passing the liquid bottoms product into the evaporating zone and countercurrently contacting the resultant gas with the liquid in said contacting zone, condensing the contacting zone gas product and passing the condensate into the contacting zone as a part of said countercurrently flowing liquid, withdrawing a liquid mixture from an intermediate point of the contacting zone, said mixture containing the two components in the same ratio of their introduction into the contacting zone and the evaporating zone respectively, separating the mixture into its two liquid components, and returning the liquids to the refrigeration cycle, the higher boiling one to the contacting zone as a liquid and the lower boiling one to the evaporating zone.

4. A refrigeration system comprising a fractional distillation tower complete with reboiler and cooler-condenser system for providing and circulating reflux liquid, a second tower with an evaporator for the base product and a cooler-condenser system for its upper end product for providing and circulating reflux liquid, means for withdrawing liquid from the second tower at a mid-point thereof and discharging it into a mid-point of the fractional distillation tower at an increased pressure, connections between the towers for conducting a substantially pure component from the condenser system from the fractional distillation tower to the evaporator of the second tower and a substantially pure liquid bottom component from the fractional distillation tower to the top of the second tower, and two fluid components with different boiling points within the towers, said components being completely miscible and readily fractionated within the temperature range within the towers, the boiling point of the low boiling component being greater than the cooling temperature available in the fractionating cooler-condenser system and less than the temperature of desired refrigeration at the fractionating and evaporating pressures respectively, the boiling point of the high boiling component being less than the reboiler temperature of the fractional distillation tower and greater than the cooling temperature of the cooler-condenser system of the second tower at the two pressures respectively.

5. Refrigeration apparatus comprising a fractional distillation tower complete with reboiler and cooler-condenser system for providing and circulating reflux liquid, a second gas to liquid contact tower, an evaporator communicating with the base of the second tower and the condenser of the first tower, a cooler-condenser system communicating with the upper end of said second tower for providing and circulating reflux liquid, means for withdrawing liquid from the second tower near its mid-point and discharging it into the fractional distillation tower near its mid-point at an increased pressure, a connection for conducting the substantially pure bottom component from the fractional distillation tower to the upper portion of the interior of the second tower and means for passing a material to be cooled through the evaporator in heat exchange relation to the liquid therein.

NELSON C. TURNER.

References Cited in the file of this patent

UNITED STATES PATENTS

| Number | Name | Date |
| --- | --- | --- |
| 2,048,355 | Sarnmark | July 21, 1936 |
| 2,337,439 | Anderson | Dec. 21, 1943 |